(12) United States Patent
Suzuki

(10) Patent No.: US 6,502,057 B1
(45) Date of Patent: Dec. 31, 2002

(54) TRANSMITTER UNIT FOR MEASURING INSTRUMENT

(75) Inventor: Miyoshi Suzuki, Hampshire (GB)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/347,921

(22) Filed: Jul. 6, 1999

(30) Foreign Application Priority Data

Jul. 21, 1998 (GB) .............................................. 9815892

(51) Int. Cl.[7] .............................. G01B 3/18; G01B 5/02; G01B 5/14
(52) U.S. Cl. ........................................ 702/162; 702/158
(58) Field of Search ........................... 702/33, 97, 122, 702/127, 150, 155–164, 166, 170, 183, 188, 189; 33/784, 818, 819; 403/286, 292–294, 331

(56) References Cited

U.S. PATENT DOCUMENTS

| 4,077,129 A | * | 3/1978 | Nishikata | 33/784 |
| 4,612,656 A | * | 9/1986 | Suzuki et al. | 377/24 |
| 4,662,262 A | * | 5/1987 | Matsumoto | 84/614 |
| 4,736,313 A | * | 4/1988 | Nishimura et al. | 702/162 |
| 4,924,163 A | * | 5/1990 | Sakamoto et al. | 297/284.9 |
| 4,924,482 A | * | 5/1990 | Shimizu et al. | 375/306 |
| 4,930,096 A | * | 5/1990 | Shimizu et al. | 340/825.52 |
| 4,973,957 A | | 11/1990 | Shimizu et al. | 340/925.52 |
| 5,008,655 A | | 4/1991 | Schlesinger et al. | 340/691.4 |
| 5,008,665 A | * | 4/1991 | Wakatsuki et al. | 340/870.26 |
| 5,136,285 A | * | 8/1992 | Okuyama | 340/870.11 |
| 5,394,047 A | * | 2/1995 | Scharlack et al. | 310/316.01 |
| 5,404,317 A | * | 4/1995 | Song et al. | 702/198 |
| 6,026,351 A | * | 2/2000 | Takeuchi | 702/155 |

* cited by examiner

Primary Examiner—Marc S. Hoff
Assistant Examiner—Manuel L. Barbee
(74) Attorney, Agent, or Firm—Oliff & Berridge, PLC

(57) ABSTRACT

A main unit (21) attached onto rear side (opposite to a side equipped with a digital display) of a slider (14) and accommodating a transmission circuit inside to transmit measurement data by wireless, and an attachment module (40) to retain the main unit attachably and detachably to the slider are provided. Front profile of the main unit (21) is formed at least not to protrude beyond front profile of the slider. The attachment module (40) is constituted to be plugged into and unplugged from an output connector (18) on the slider (14), and has a connector (44) to connect the output connector and the transmission circuit in the main unit.

10 Claims, 7 Drawing Sheets

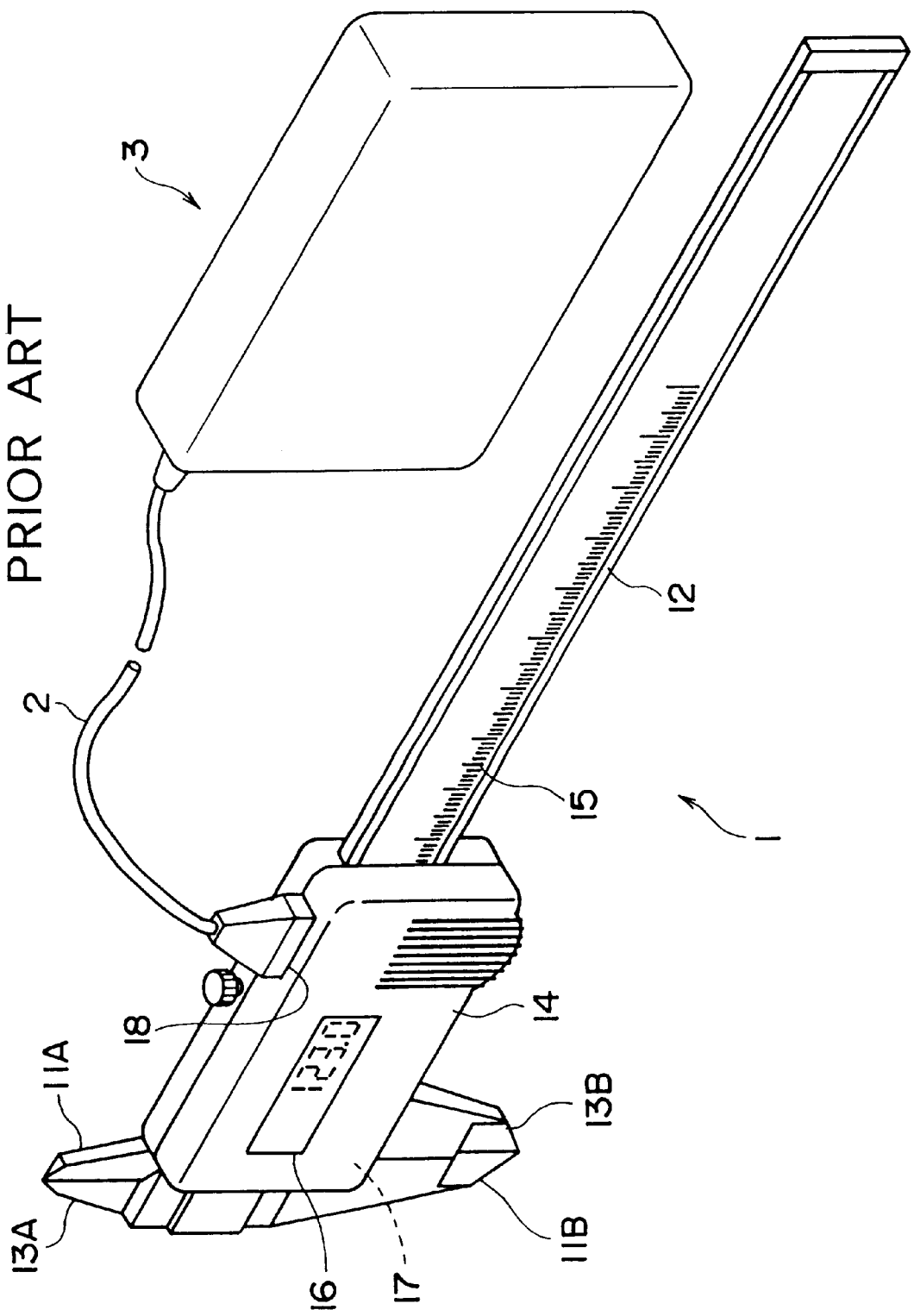

TRANSMITTER UNIT FOR MEASURING INSTRUMENT

BACKGROUND OF THE INVENTION

1. Field of the Invention

The present invention is relevant to a transmitter unit for measuring instruments. More specifically, the present invention is relevant to a transmitter unit for measuring instruments that transmits measurement data measured by measuring instruments such as vernier caliper, depth gauge, and so on to external data processing instruments by wireless.

2. Description of Related Figure

Measurement data acquisition/processing systems are conventionally known, where each measurement terminal transmits measurement data to data processing instruments, and the data processing instruments calculate quality control data or statistic data by means of collecting and processing the measurement data transmitted from each measurement terminal.

Above all, in a system where each measurement terminal transmits measurement data by wireless (wireless measurement data transmission system), each measurement terminal needs to be equipped with a wireless transmitter unit respectively.

As a measurement terminal equipped with a wireless transmitter unit, a vernier caliper shown in FIG. 7 is conventionally known, which consists of a electronic vernier caliper 1 and a transmitter unit 3 connected through a connection cable 2.

The electronic vernier caliper 1 consists of a main beam 12 and a slider 14 travelling along the main beam 12. The main beam 12 has an inner measuring jaw 11A and an outer measuring jaw 11B on the end. The slider 14 has an inner measuring jaw 13A and an outer measuring jaw 13B on the end to measure an artifact together with the jaw 11A or 11B by contact. The slider 14 is equipped with an electric hardware module for electronic vernier caliper.

As detail of the electric hardware module for electronic vernier caliper, the slider 14 is equipped with a signal processor 17 inside, a digital display 16 on front, and an output connector 18 on top. The signal processor 17 calculates travelling displacement of the slider 14 (measurement data) by processing signal from an incremental or absolute position sensor 15 fitted between the main beam 12 and the slider 14 to detect travelling displacement of the slider 14 along the main beam 12. The digital display 16 displays measurement data calculated by the signal processor 17. The output connector 18 outputs measurement data calculated by the signal processor 17 to the transmitter unit 3 through the connection cable 2.

The vernier caliper shown on FIG. 7 is operated as follows. Contact the inner measurement jaw 11A, 13A or the outer measurement jaw 11B, 13B with an measurement artifact by travelling the slider 14 along the main beam 12 on condition that the transmitter unit 3 is connected with the output connector 18 on the slider 14 through the connection cable 2. Then, travelling displacement of the slider 14, in other words, dimension between the inner measurement jaw 11A and 13A or the outer measurement jaw 11B and 13B (measurement data) is digitally displayed on the digital display 16. By pressing a transmission command switch (not shown) here, the measurement data is transmitted from the transmitter unit 3 by wireless.

However, according to the vernier caliper structure equipped with a conventional wireless transmitter unit, the connection cable 2 may obstruct measurement when travelling the slider 14 along the main beam 12.

It is an idea to fix the transmitter unit 3 onto the slider 14 by using special fixing means since it is inconvenient to carry the electronic vernier caliper 1 with which the transmitter unit 3 is danglingly connected through the connection cable 2. However, a special fixing mean to fix the transmitter unit 3 onto the slider 14, besides the connection cable 2 to connect the electronic vernier caliper 1 with the transmitter unit 3 electrically, causes inevitable increase of number of components and cost.

In addition, the fixing work is difficult because the transmitter unit 3 has to be firmly fixed onto the slider 14 not to be obstructive to measurement. Furthermore, even if the transmitter unit 3 is firmly fixed onto the slider 14, measurement may still be obstructed by interference between a measurement artifact and the transmitter unit 3 in case that profile of the transmitter unit 3 protrudes beyond front profile of the slider 14.

This problem occurs not only in case of a vernier caliper but also other instruments, such as depth gauge (depth measuring instrument) or linear scale unit (linear displacement sensor), which measures dimensions of an artifact from the slider travelling displacement along the main beam, thickness gauge (thickness measuring instrument), which measures thickness of an artifact from the spindle travelling displacement against the frame in axial direction, and so on.

The object of the present invention is to provide a transmitter unit for measuring instruments which can overcome above conventional problem, in other words, which is not obstructive to measurement, does not cause increase of number of components, and can be attached onto measuring instruments firmly and easily.

SUMMARY OF THE INVENTION

In order to attain aforementioned object, the transmitter unit for measuring instruments on the present invention is to be attached to measuring instruments that have a main beam and a slider travelling along the main beam. As for detail of the measuring instruments, the slider has a signal processor to calculate measurement data based on the slider travelling displacement along the main beam and an output connector to output measurement data calculated by the signal processor. The transmitter unit for measuring instruments on the present invention is characterized as follows. The transmitter unit consists of a main unit, which accommodates a transmission circuit inside to transmit measurement data by wireless, and an attachment module to retain the main unit attachably and detachably on the slider. The attachment module, which is constituted to be plugged into and unplugged from the output connector on the slider, has a connector to connect the transmission circuit in the main unit with the output connector on the slider.

In this structure, by inserting the attachment module into the output connector on the slider, the transmission circuit in the main unit is electrically connected with the output connector on the slider automatically as well as the main unit is mechanically retained onto the slider.

In other words, mechanical means to retain the main unit onto the slider works also as electrical means to connect the transmission circuit in the main unit with the output connector on the slider. Accordingly, the transmitter unit can be attached firmly and easily only by inserting the attachment module into the output connector on the slider without using any extra components. In addition, this cableless structure can keep measurement free from obstruction by connection cables.

Also, the transmitter unit for measuring instruments on the present invention is to be attached to measuring instruments that have a main beam and a slider equipped with a digital display in addition to a signal processor and an output connector aforementioned above. The digital display displays the measurement data calculated by the signal processor. In this case, the attachment module retains the main unit attachably and detachably on second side of the slider opposite to first side on which the digital display is located. Further, the transmitter unit for measuring instruments on the present invention is characterized by that the main unit profile is formed at least not to protrude beyond first side profile of the slider on condition that the main unit is retained onto second side of the slider, in addition to the aforementioned characters.

This structure can keep measurement free from obstruction by interference between a measurement artifact and the main unit, besides the aforementioned effects, since the main unit profile at least does not protrude beyond first side profile of the slider (side equipped with the digital display).

On the above explanation, any measuring instrument that has a main beam and a slider travelling along the main beam is applicable.

A vernier caliper that has a main beam with jaws and a slider travelling along the main beam with jaws to measure an artifact together with jaws on the main beam by contact is an example. On the vernier caliper, the slider has a signal processor to calculate measurement data based on the slider travelling displacement along the main beam, a digital display to display measurement data calculated by the signal processor, and an output connector to output measurement data calculated by the signal processor. So is a linear scale unit (linear displacement sensor) or the like that has similar structure.

The attachment module may be any kind of constitution so long as that can retain the main unit onto the slider. However, on the present invention, the attachment module consists of a first retainer and a second retainer to be plugged into and unplugged from the output connector on the slider as follows. The first retainer is extended from the main unit striding over the slider. The second retainer is extended square from the first retainer end and parallel to the main unit. The second retainer has a connector on the end to be connected with the output connector on the slider.

In this structure, the transmitter unit can be easily attached and firmly retained only by inserting the second retainer into the output connector on the slider from right above. Also, the transmitter unit can easily be detached by pulling off in the reverse direction. Accordingly, the transmitter unit can be easily retrofitted to existing electronic vernier caliper equipped with output connector or any other similar measuring instruments.

The transmitter unit may accidentally come off from the slider on this retention condition if force in reverse direction of insertion is applied to the main unit. In order to protect from this accident, a locking means to restrict movement of the transmitter unit in direction of the second retainer coming off from the output connector is provided on a side of the main unit opposite to a side on which the first retainer fitted.

Concretely, the locking means consists of a guide groove on the main unit and a locking piece sliding along the guide groove. The guide groove is formed toward the slider on a side of the main unit opposite to a side on which first retainer is fitted. By sliding along the guide groove, the locking piece can projects and retracts over fourth side of the slider opposite to third side on which the output connector is located. By this mechanism, the transmitter unit can be protected from coming off from the slider in simple structure as the locking piece slid along the guide groove and projected over the fourth side of the slider restricts movement of the main unit in direction of coming off from the slider.

On this locking means, the locking piece can be fixed to the slider not to come off from the guide groove. Accordingly, the coming-off protection mentioned above can be more reliable.

In the transmitter unit structure mentioned above, the attachment module may be constituted integrally with the main unit. However, on the present invention, the attachment module is constituted as a separate unit, which can be coupled and decoupled with the main unit through a coupling mechanism.

In this constitution, both the main unit and the attachment module has a connector, which is coupled automatically when the attachment module is fitted to the main unit. Since this constitution provides electrical connection when the attachment module is fitted to the main unit, no special wiring arrangement needs to be provided. Accordingly, it is easy to assemble the transmitter unit.

In addition, the coupling mechanism consists of retaining snaps on either the main unit or the attachment module and engaging holes to be coupled with the snaps on the other. Accordingly, the attachment module can be coupled and decoupled with the main unit in simple structure.

Further, the main unit consists of a pair of separable case halves, containing transmission circuit inside, which has at least one retaining snap each. Accordingly, the three parts (a pair of the case halves and the attachment module) can be integrally assembled by putting the retaining snaps on the main unit case halves into the engaging holes on the attachment module after the case halves are coupled.

As mentioned before, the attachment module consists of a first retainer, which is extended from the main unit striding over the slider, and a second retainer to be plugged into and unplugged from the output connector on the slider, which is extended square from the first retainer end and parallel to the main unit. In order to provide ergonomic operation in this structure, a switch to send data transmission command to the transmission circuit is located on the first retainer.

More than one function can be operated with this single switch by means of duration control. Concretely, transmitting measured data, canceling transmitted data, and setting unique ID for each transmitter unit can be controlled in accordance with duration of the switch operation.

Further, an indicator device (or light indicator, such as LED=light-emitting diode, EL=electro-luminescent display, laser display, and electric lamp) responding on the switch operation is located on a same side of the first retainer as display side of the digital display on the slider. Accordingly, the switch operation can be monitored in same view as reading measurement data on the digital display.

The transmitter unit for measuring instruments on the present invention can be applied not only to measuring instruments that have a main beam and a slider travelling along the main beam but also to other kind of measuring instruments, such as thickness gauges (thickness measuring instruments) or micrometers, which has a frame and a spindle travelling against the frame.

BRIEF DESCRIPTION OF THE DRAWINGS

FIG. 7 is an isometric drawing to show an electronic vernier caliper equipped with a conventional wireless transmitter unit.

DETAIL DESCRIPTION OF THE PREFERRED EMBODIMENT(S)

Figure 1:
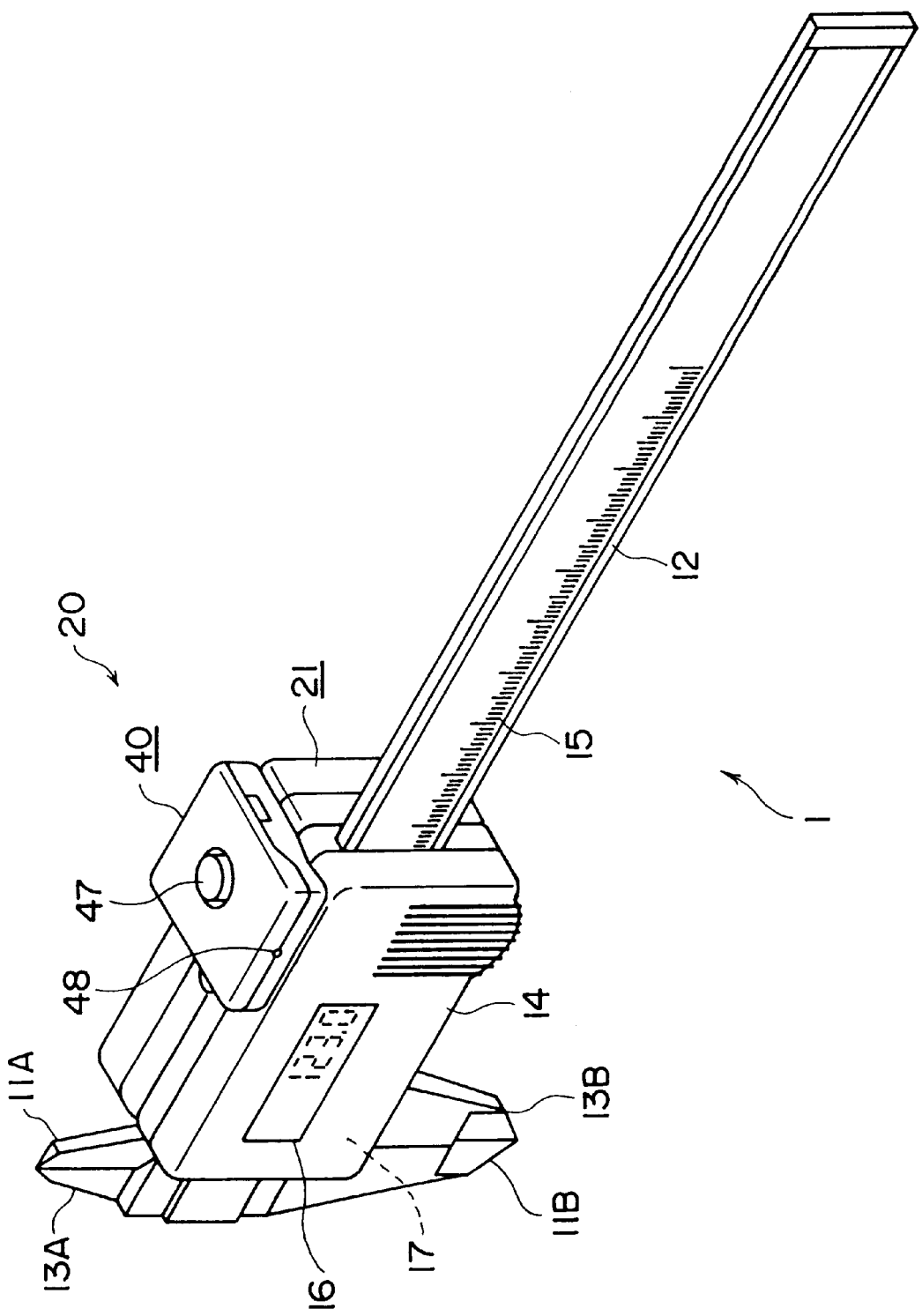
FIG. 1 is an isometric drawing to show a preferred embodiment that a transmitter unit for measuring instruments according to the present invention is attached to an electronic vernier caliper.
Figure 2:
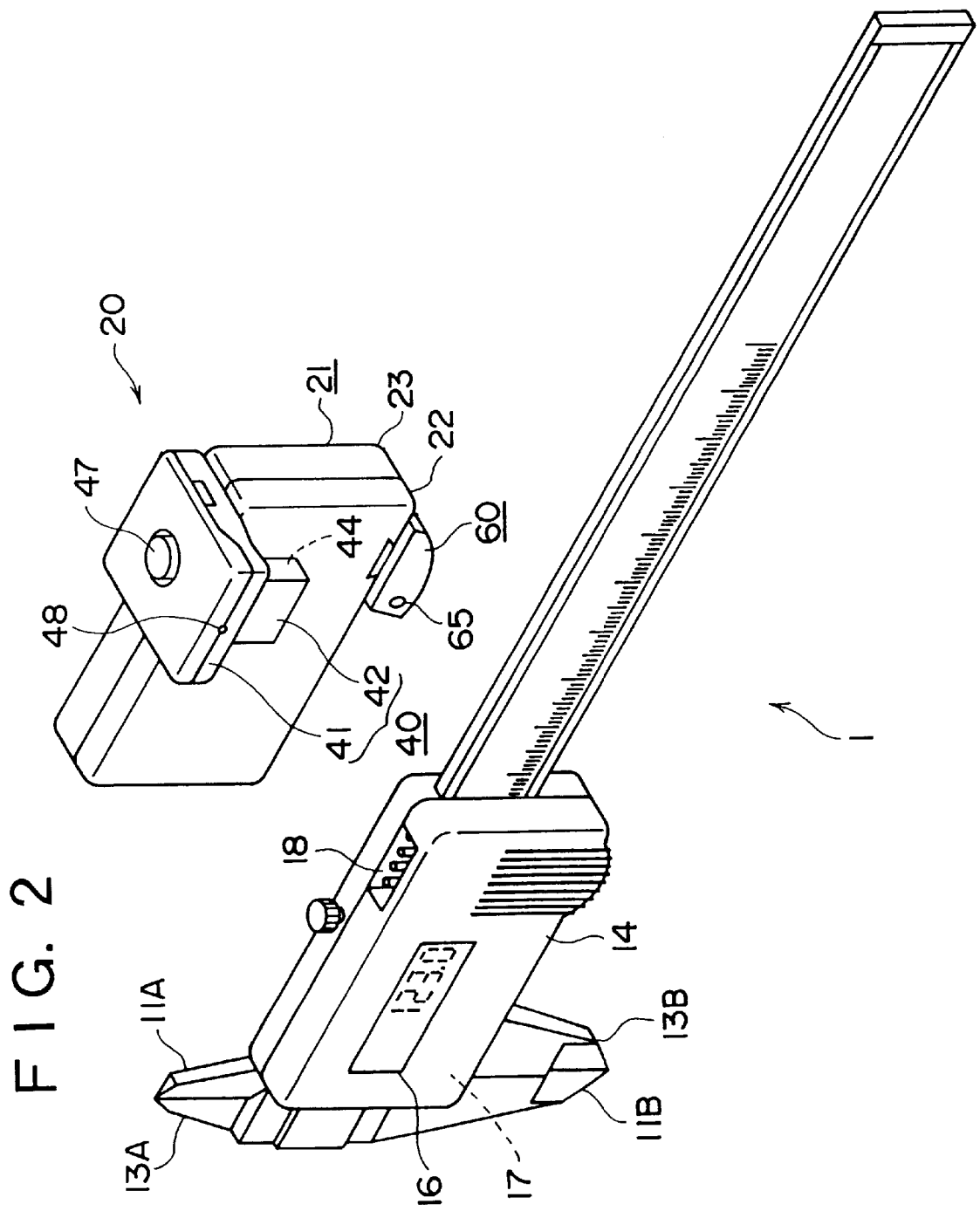
FIG. 2 is an isometric drawing to show a condition of the above embodiment that the transmitter unit for measuring instruments is detached from the electronic vernier caliper.
Figure 3:
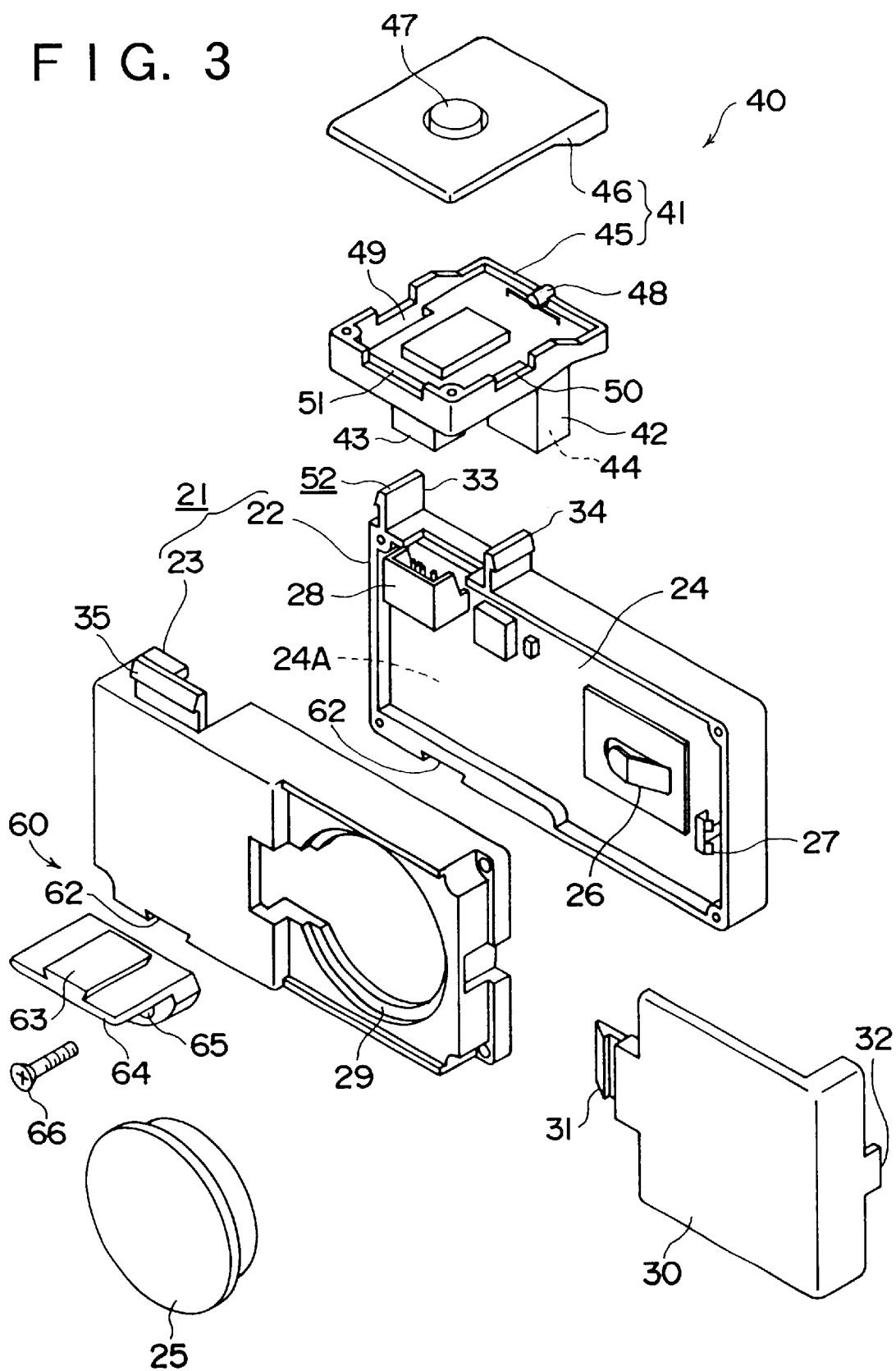
FIG. 3 is an isometric assembling drawing to show the components of the transmitter unit for measuring instruments according to the above embodiment.

A preferred embodiment of present invention is explained below with reference to drawings. FIG. 1 is an isometric drawing to show a condition that the transmitter unit for measuring instruments according to a preferred embodiment of the present invention is attached to an electronic vernier caliper. FIG. 2 is an isometric drawing to show a condition that a transmitter unit for measuring instruments according to the above embodiment is detached from an electronic vernier caliper. FIG. 3 is an isometric assembling drawing to show the components of a transmitter unit according to the above embodiment. As for the electronic vernier caliper, same symbols are used in explanations below, and those detail descriptions are omitted because that is identical with one shown in FIG. 7 described before.

The transmitter unit for measuring instruments 20 according to the present embodiment is located on rear side of the slider 14 of an electronic vernier caliper 1, in other word, the opposite side (second side) to front side (first side) of the slider 14 equipped with a digital display 16. The transmitter unit 20 consists of a main unit 21, an attachment module 40, and a locking means 60. The main unit 21 accommodates a transmission circuit 24A inside (see FIG. 3) to transmit measurement data or the like by wireless. The attachment module 40 fitted on top of the main unit 21, which can be coupled and decoupled with the main unit 21, retains the main unit 21 onto rear side of the slider 14. The locking means 60 holds the condition that the main unit 21 is retained onto the slider 14 by the attachment module 40.

The main unit 21 has rectangular front profile, which at least does not protrude beyond front profile of the slider 14 on condition that the main unit 21 is retained onto rear side of the slider 14. The main unit 21 consists of a pair of separable case halves 22, 23, which contains the transmission circuit 24A inside.

As for a pair of the case halves 22, 23, one case half 22 accommodates a circuit board 24 on which the transmission circuit 24A is printed. On the circuit board 24, terminals 26, 27, which contact respectively with + and electrode of a battery 25 housed in the main unit 21, and a connector 28 are mounted. On the other case half 23, an opening 29 as an access for replacing battery 25 is formed and a detachable lid plate 30 is attached to cover the opening 29. The lid plate 30 has a retaining snap 31 on one end, which engages with the case half 23 to retain the lid plate 30 onto the case half 23, and a contact supporter 32 on the other end, which pushes the terminal 27 inward to make contact with the battery 25.

In addition, two retaining snaps 33, 34, which faces each other, are formed on top of the case half 22, while one retaining snap 35 is formed on top of the case half 23.

The attachment module 40 consists of a first retainer 41, which is extended from top of the main unit 21 striding over top of the slider 14, and a second retainer 42 to be plugged into and unplugged from the output connector 18, which is extended square from the first retainer 41 end and parallel to the main unit 21. The first retainer 41 has a connector 43 on the base end to be connected with the connector 28 and the second retainer 42 has a connector 44 on the end to be connected with the output connector 18.

The first retainer 41 consists of a bottom case 45 and top case 46 and is equipped with a button switch 47 and an indicator 48. The button switch 47 sends a data transmission command or the like to the transmission circuit 24A. The indicator 48 lights or blinks when the button switch 47 is operated. The button switch 47 is located on center top of the lid plate 46 being exposed outward. The indicator 48 is located on front side of the first retainer 41, that is, on the same side as displaying side of the digital display 16. Further, engaging holes 49, 50, 51, which are coupled with the retaining snap 33, 34, 35 respectively, are formed around the bottom case 45. These retaining snaps 33, 34, 35 and engaging holes 49, 50, 51 constitute a coupling mechanism 52 to retain the attachment module 40 attachably and detachably onto the main unit 21.

The transmission circuit 24A has a means to control three functions in accordance with duration of the button switch 47 operation as follows.

In case that the duration time of the button switch 47 is within 2 seconds ($t \leq 2$), current measurement data is transmitted. In case that the duration time is between 2 seconds and 4 seconds ($2 < t < 4$), data cancel command is transmitted to cancel previous transmitted data. In case that the duration time is over 6 seconds ($6 < t$), unique ID number for the transmitter unit is set.

Concretely, unique ID number is set as the following operation. Move the slider 14 so that an upper two digits (or lower two digits) of the vernier caliper display matches to desired figure. Then, keep pressing the button switch 47 for over 6 seconds. After the button switch is released, the two-digit figure on the vernier caliper display is set as the unique ID number for the transmitter unit.

Incidentally, in case of abnormal measurement data (e.g. by over-speed of the slider 14 or by a contamination on the scale surface of the main beam 12), an error code instead of measurement data is transmitted on above operation ($t \leq 2$). Error processing is executed in receiver side according to the transmitted error code.

The indicator 48 works according to the button switch 47 operation as follows:

① Lights for approximately 0.2~0.3 second as soon as the button switch 47 is pressed.

② Keeps lighting from 2 to 4 seconds after the button switch is pressed if the button switch 47 is held on. By releasing the button switch 47 during this period (while the indicator 48 is lighting), previous transmitted data can be cancelled. In other words, cancel command is transmitted.

③ Goes off if the button switch 47 is held on over 4 seconds.

④ Lights again if the button switch 47 is held on over 6 seconds then blinks until the button switch 47 is released. By releasing the button switch 47 during this period (while the indicator 48 is blinking), a unique ID number for the transmitter can be set.

The locking means 60 consists of a dovetail groove 62, which is formed as a guide channel toward the slider 14 on bottom side of the main unit 21, and a locking piece 64, which can project and retract over bottom side (fourth side) of the slider 14 by sliding along the dovetail groove 62. The locking piece 64 has a guide shoe 63 on top, which fits into and slide along the dovetail groove 62, and a clearance hole 65 on front. The locking piece 64 can be fixed to the slider 14 by a screw 66 through the clearance hole 65. In this case, the screw 66 can be screwed into a threaded hole on the slider 14 for attaching a thumb roller unit (a fine-feed roller to travel the slider 14).

In the above constitution, contact the inner measurement jaw 11A, 13A or the outer measurement jaw 11B, 13B with a measurement artifact by travelling the slider 14 along the main beam 12 on condition that the transmitter unit 20 is attached onto rear side of the slider 14 of an electronic vernier caliper 1 as shown in FIG. 1. Then, travelling displacement of the slider 14, that is, dimension between the inner measurement jaw 11A and 13A or the outer measurement jaw 11B and 13B (measurement data) is digitally displayed on the digital display 16.

Since the transmitter unit 20 profile does not protrude beyond front profile of the slider 14, measurement is not obstructed by interference between a measurement artifact and the transmitter unit 20. By pressing the button switch 47 here, measurement data is transmitted from the transmission circuit 24A in the transmitter unit 20 to external data processors or the like by wireless. According to duration time of the button switch 47, cancel command to cancel previous transmitted data is transmitted, or a unique ID number for the transmitter unit is set. Data processing instruments calculate quality control data or statistic data by collecting and processing measurement data transmitted from each measurement terminal.

According to the present embodiment, the transmitter unit 20 consists of the main unit 21 that at least does not protrude beyond front profile of the slider 14 and the attachment module 40 to retain the main unit 21 onto rear side of slider 14. This cableless structure can keep measurement free from obstruction by interference between a measurement artifact and the main unit 21. In addition, this cableless structure can also keep measurement free from obstruction by connection cables.

Further, the main unit 21 is automatically and firmly retained onto the slider 14 by inserting the attachment module 40 into the output connector 18 on the slider 14. Besides, the transmission circuit 24A in the main unit 21 is automatically connected with the output connector 18 on the slider 14 when the main unit 21 is attached onto rear side of the slider 14 with the attachment module 40 since the attachment module 40 has the connector 44 to connect the output connector 18 on the slider 14 with the transmission circuit 24A in the main unit 21. Accordingly, no special wiring arrangement needs to be provided. By combining mechanical means to retain the main unit 21 onto the slider 14 and electrical means to connect the transmission circuit 24A in the main unit 21 with the output connector 18 on the slider 14, the present embodiment is constituted handy, simple and economical without increase number of components.

Further, the attachment module 40 consists of a first retainer 41, which is extended from the main unit 21 striding over the slider 14, and a second retainer 42 to be plugged into and unplugged from the output connector 18, which is extended square from the first retainer 41 end and parallel to the main unit 21. Also, the second retainer 42 has a connector 44 on the end to be connected with the output connector 18. According to this structure, the main unit 21 is retained onto rear side of the slider 14 by inserting the second retainer 42 into the output connector 18 from right above the slider 14. Therefore, the transmitter unit 20 can be attached easily, and can also be detached easily by pulling off in the reverse direction.

Further, the main unit 21 can be retained onto the slider 14 reliably since the locking means 60 is provided on bottom side of the main unit 21 to protect the main unit 21 from coming off from the slider 14.

The locking means 60 consists of the guide groove 62 on bottom side of the main unit 21 and the locking piece 64 sliding along the guide groove 62. According to this design, sufficient coming-off protection function can be provided in simple structure as the main unit 21 is protected from coming off from the slider 14 by sliding the locking piece 64 along the guide groove 62 and projecting it over bottom side of the slider 14. On this condition, the locking piece 64 can be fixed to the slider 14 (by the screw 66 inserted through the clearance hole 65). Accordingly, the locking piece 64 is protected from coming off from the dovetail groove 62.

Further, the attachment module 40 can be coupled and decoupled with the main unit 21 through the coupling mechanism 52. Also, the main unit 21 and the attachment module 40 has the connector 28, 43 respectively, which is coupled when the attachment module 40 is fitted to the main unit 21. In this constitution, electrical connection is provided automatically when the attachment module 40 is fitted to the main unit 21. Accordingly, no special wiring arrangement is necessary, so that it is easy to assemble them.

Further, the coupling mechanism 52 consists of retaining snaps 33, 34, 35 on the main unit 21 and engaging holes 49, 50, 51 on the attachment module 40 to be coupled with each snap respectively, so that the attachment module 40 can be coupled and decoupled with the main unit 21 in simple structure.

Here, the main unit 21 consists of a pair of separable case halves 22, 23, which accommodates transmission circuit inside. The case half 22 has two retaining snap 33, 34, while the case half 23 has one retaining snap 35. Accordingly, the three parts (a pair of case halves 22, 23 and the attachment module 40) can be integrally assembled by putting the retaining snaps 33, 34, 35 on the case halves 22, 23 into the engaging holes 49, 50, 51 on the attachment module 40 after the case halves 22, 23 are combined.

Further, the button switch 47 to transmit measurement data or data cancel command and to set unique ID number for each transmitter unit is located on top of the first retainer 41 in order to provide ergonomic operation. Concretely, while operating (travelling) the slider 14 by one hand, an operator can press the button switch 47 by a finger of the same hand (normally forefinger).

As the indicator 48 lights or blinks in this operation, it can be monitored visually whether the button switch 47 has been pressed properly or not. Also, the indicator 48 is located on front side of the first retainer 41, in short, the same side as front side of the digital display 16, on which measurement data is displayed. Accordingly, operation of the button switch 47 can easily be monitored in same view as reading measurement data without moving viewpoint largely from the display.

In the aforementioned embodiment, the attachment module 40 is located on top of the main unit 21 striding over top of the slider 14. However, the attachment module 40 may be located on bottom side of the main unit 21 striding over bottom of the slider 14 according to location of the connector 18 on an electric hardware module for electronic vernier caliper.

Also in the aforementioned embodiment, the coupling mechanism 52 consists of the retaining snaps 33, 34, 35 on the main unit 21 and the engaging holes 49, 50, 51 on the attachment module 40 to be coupled. However, this structure may be constituted reverse. That is, the retaining snaps 33, 34, 35 may be provided on the attachment module 40, and the engaging holes 49, 50, 51 may be provided on the main unit 21 to be coupled. The number of the retaining snaps and the engaging holes may be any number more than one regardless of this constitution.

Further, the transmitter unit according to the present invention is not restricted to be applied only to vernier calipers as described aforementioned embodiment.

Figure 4:
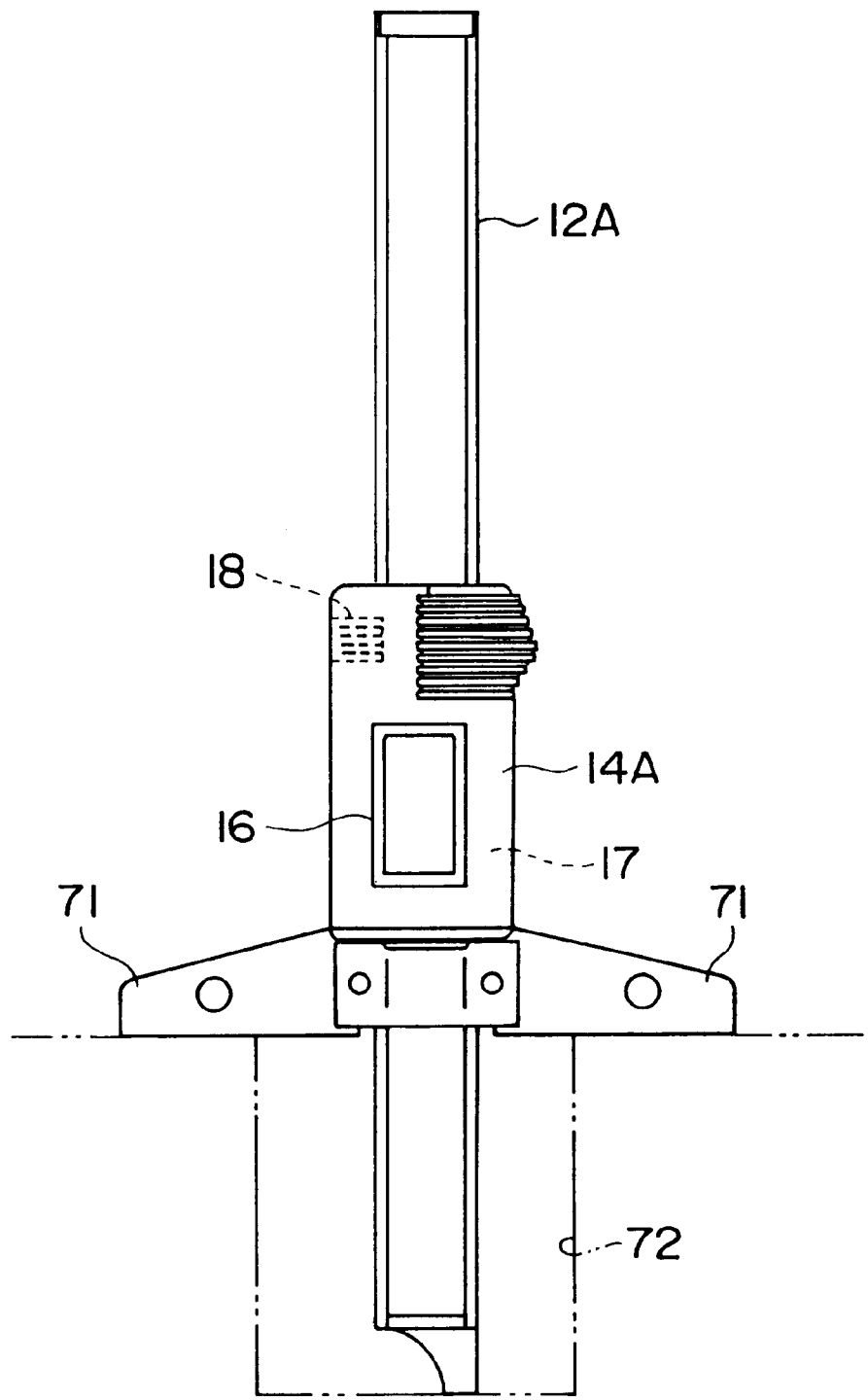
FIG. 4 is a front elevation to show a depth gauge to which the transmitter unit for measuring instruments according to the present invention is applied.

For example, the transmitter unit according to the present invention can be applied to a depth gauge (depth measuring instrument) shown in FIG. 4, which has a main beam 12A and a slider 14A travelling along the main beam 12A. The depth gauge measures depth of a hole 72 from distance between the end of the main beam 12A and a base plate 71. If the slider 14A of the depth gauge has similar structure to the aforementioned slider 14, the transmitter unit 20 can be attached onto rear side of the slider 14A.

Figure 5:
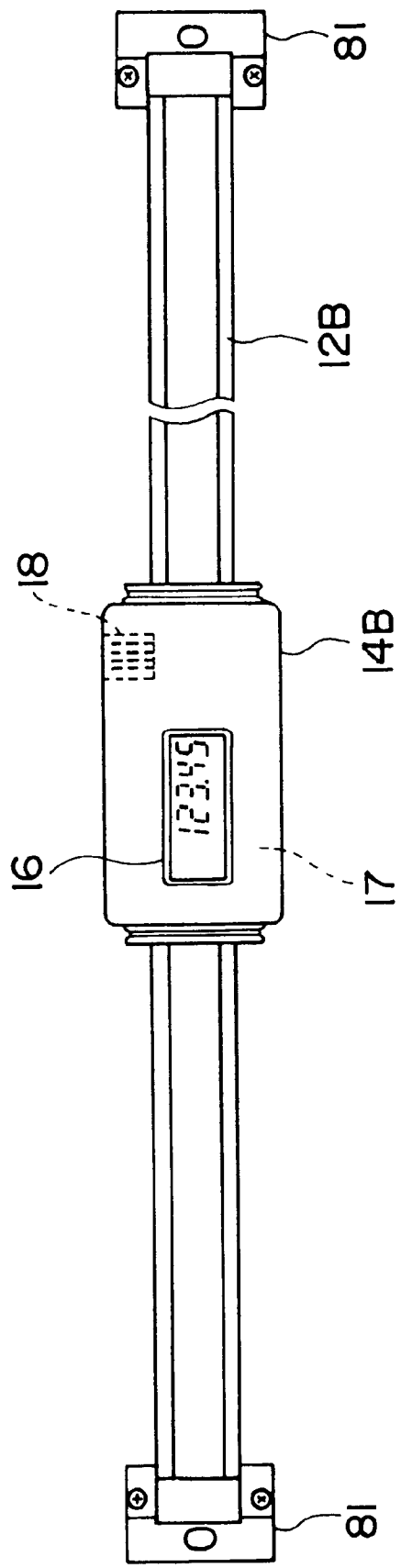
FIG. 5 is a front elevation to show a linear scale unit (linear displacement sensor) to which the transmitter unit for measuring instruments according to the present invention is applied.

Also, the transmitter unit on the present invention can be applied to a linear scale unit (linear displacement sensor) shown in FIG. 5, which has a main beam 12B equipped with an attachment 81 on both ends and a slider 14B travelling along the main beam 12B. The linear scale unit is fitted to machine tools to encode actuator position by fixing the main beam 12B with the attachment 81 on the machine body and linking the slider 14B with the actuator on the axis. Also in this case, if the slider 14B has similar structure to the aforementioned slider 14, the transmitter unit 20 can be attached onto the slider 14B.

Figure 6:
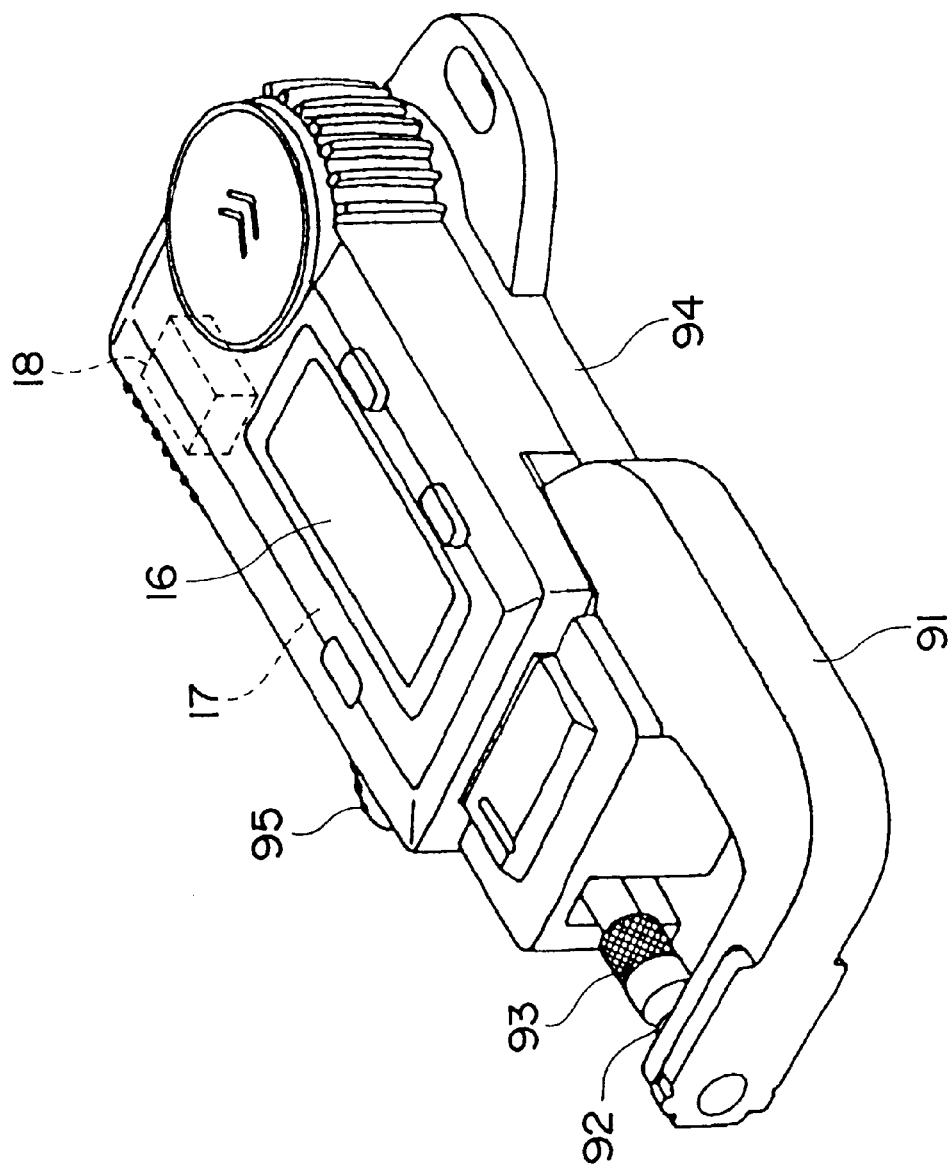
FIG. 6 is an isometric drawing to show a thickness gauge (thickness measuring instrument) to which the transmitter unit for measuring instruments according to the present invention is applied.

Further, the transmitter unit according to the present invention can be applied to a thickness gauge (thickness measuring instrument) shown in FIG. 6, which has a U-shaped frame 91, an anvil 92, and a spindle 93, and a main body 94. The anvil 92 is mounted inward on one side of the frame 91. The spindle 93, which is mounted in the other side of the frame 91, travels toward the anvil 92. The main body 94, which is jointed with the frame 91 on same side as the spindle 93 mounted, is equipped with a signal processor 17 to calculate measurement data based on travelling displacement of the spindle 93, a digital display 16 to display the measurement data calculated by the signal processor 17, and an output connector 18 to output the measurement data calculated by the signal processor 17. Also in this case, if the main body 94 jointed with the frame 91 has similar structure to the aforementioned slider 14, the transmitter unit 20 can be attached onto the main body 94. Incidentally, symbol 95 in the FIG. 6 corresponds to a lever to control the spindle 93 travelling.

The transmitter unit for measuring instruments according to the present invention can be attached firmly and easily without extra components or obstructing measurement.

What is claimed is:

1. A transmitter unit to be attached to measuring instruments, the measuring instruments having a main beam equipped with jaws and a slider traveling along the main beam and equipped with jaws to contact with a measurement artifact together with the jaws on the main beam, the slider having a signal processor to calculate measurement data based on traveling displacement of the slider along the main beam, a digital display to display measurement data calculated by the signal processor, and an output connector to output measurement data calculated in the signal processor, the transmitter unit comprising:

a main unit accommodating a transmission circuit inside to transmit measurement data by wireless and an attachment module to retain the main unit attachably and detachably onto second side of the slider opposite to first side of the slider on which the digital display is equipped, wherein profile of the main unit is formed at least not to protrude beyond first side profile of the slider on condition that the main unit is retained onto second side of the slider, wherein the attachment module is constituted to be plugged into and unplugged from the output connector, and has a connector to connect the output connector with the transmission circuit in the main unit, wherein the attachment module consists of a first retainer extended from the main unit striding over the slider and a second retainer extended square from a first retainer end and parallel to the main unit, wherein the second retainer can be plugged into and unplugged from the output connector on the slider, and has the connector on an end to be connected with the output connector, wherein a locking means to restrict movement of the second retainer in direction of coming off from the output connector is provided on a side of the main unit opposite to a side on which the first retainer is fitted, and wherein the locking means consists of a guide groove toward the slider, which is formed on a side of the main unit opposite to a side on which the first retainer is fitted, and a locking piece, which can project and retract over fourth side of the slider opposite to third side equipped with the output connector by sliding along the guide groove.

2. A transmitter unit to be attached to measuring instruments, the measuring instruments having a frame and a movable spindle provided to the frame, the frame having a signal processor to calculate measurement data based on travelling displacement of the spindle and an output connector to output measurement data calculated in the signal processor, the transmitter unit comprising:

a main unit accommodating a transmission circuit inside to transmit measurement data by wireless and an attachment module to retain the main unit attachably and detachably onto the frame, wherein the attachment module is constituted to be plugged into and unplugged from the output connector, and has a connector to connect the output connector with the transmission circuit in the main unit, wherein the attachment module consists of a first retainer extended from the main unit striding over the spindle and a second retainer extended square from a first retainer end and parallel to the main unit, wherein the second retainer can be plugged into and unplugged from the output connector, and has the connector on an end to be connected with the output connector, wherein a locking means to restrict movement of the second retainer in direction of coming off from the output connector is provided on a side of the main unit opposite to a side on which the first retainer is fitted, and wherein the locking means consists of a guide groove toward the slider, which is formed on a side of the main unit opposite to a side on which the first retainer is fitted, and a locking piece, which can project and retract over fourth side of the slider opposite to third side equipped with the output connector by sliding along the guide groove.

3. A transmitter unit to be attached to measuring instruments, the measuring instruments having a main beam and a slider travelling along the main beam, the slider having a signal processor to calculate measurement data based on travelling displacement of the slider along the main beam, a digital display to display measurement data calculated by the signal processor, and an output connector to output measurement data calculated in the signal processor, the transmitter unit comprising:

a main unit accommodating a transmission circuit inside to transmit measurement data by wireless and an attachment module to retain the main unit attachably and detachably onto second side of the slider opposite to first side of the slider on which the digital display is equipped, wherein profile of the main unit is formed at least not to protrude beyond first side profile of the slider on condition that the main unit is retained onto second side of the slider, wherein the attachment module is constituted to be plugged into and unplugged from the output connector, and has a connector to connect the output connector with the transmission circuit in the main unit, wherein the attachment module consists of a first retainer extended from the main unit striding over the slider and a second retainer extended square from a first retainer end and parallel to the main unit, wherein the second retainer can be plugged into and unplugged from the output connector on the slider, and has the connector on an end to be connected with the output connector, wherein a locking means to restrict movement of the second retainer in direction of coming off from the output connector is provided on a side of the main unit opposite to a side on which the first retainer is fitted, and wherein the locking means consists of a guide groove toward the slider, which is formed on a side of the main unit opposite to a side on which the first retainer is fitted, and a locking piece, which can project and retract over fourth side of the slider opposite to third side equipped with the output connector by sliding along the guide groove.

4. The transmitter unit according to claim 3, wherein the locking piece can be fixed on the slider.

5. The transmitter unit according to claim 3, wherein the attachment module can be coupled and decoupled with the main unit through a coupling mechanism, and wherein the main unit and the attachment module have a connector respectively to be coupled when the attachment module is fitted to the main unit.

6. The transmitter unit according to claim 5, wherein the coupling mechanism consists of retaining snaps on either the main unit or the attachment module and an engaging holes to be coupled with the retaining snaps on the other.

7. The transmitter unit according to claim 6, wherein the main unit consists of a pair of separable case halves accommodating the transmission circuit inside, and wherein at least one retaining snap is provided to each of the case half.

8. The transmitter unit according to claim 3, wherein the first retainer is equipped with a switch to send data transmission command to the transmission circuit.

9. The transmitter unit according to claim 8, wherein the transmission circuit has means to control transmitting measurement data, transmitting cancel command, and setting unique ID for each transmitter according to duration of the switch operation.

10. The transmitter unit according to claim 8, wherein the first retainer is equipped with an indicator device, which lights or blinks according to the switch operation, on the same side as a displaying side of the digital display.

* * * * *